No. 703,316. Patented June 24, 1902.
S. D. SMITH.
MACHINE FOR PREVENTING DEPOSITION OF FROST ON VEGETATION.
(Application filed Aug. 15, 1901.)
(No Model.) 2 Sheets—Sheet 1.
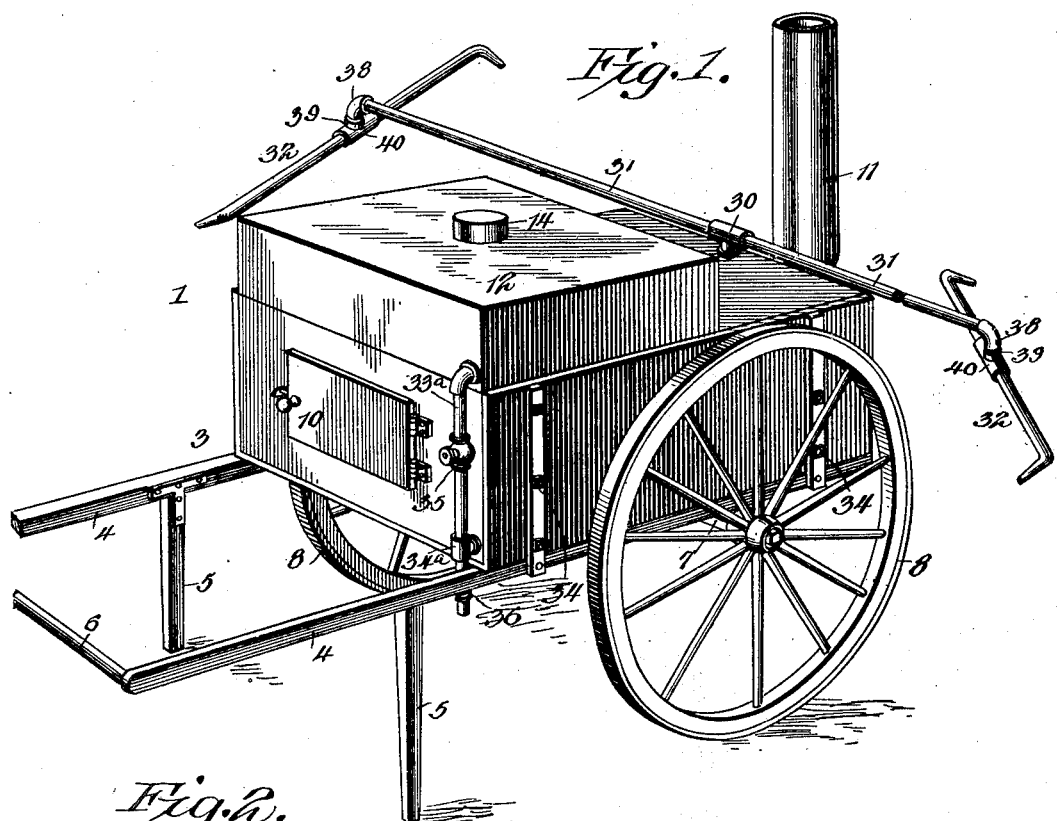
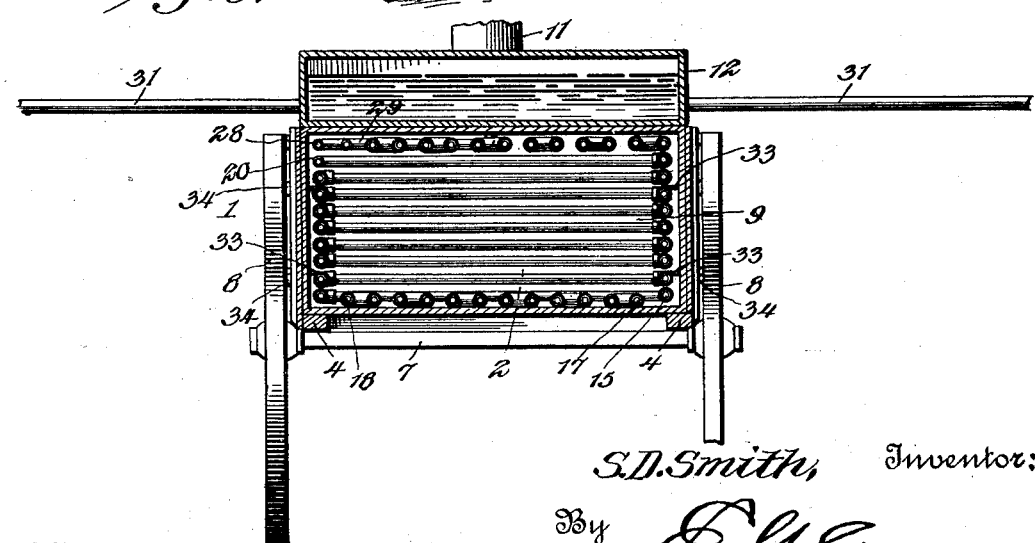

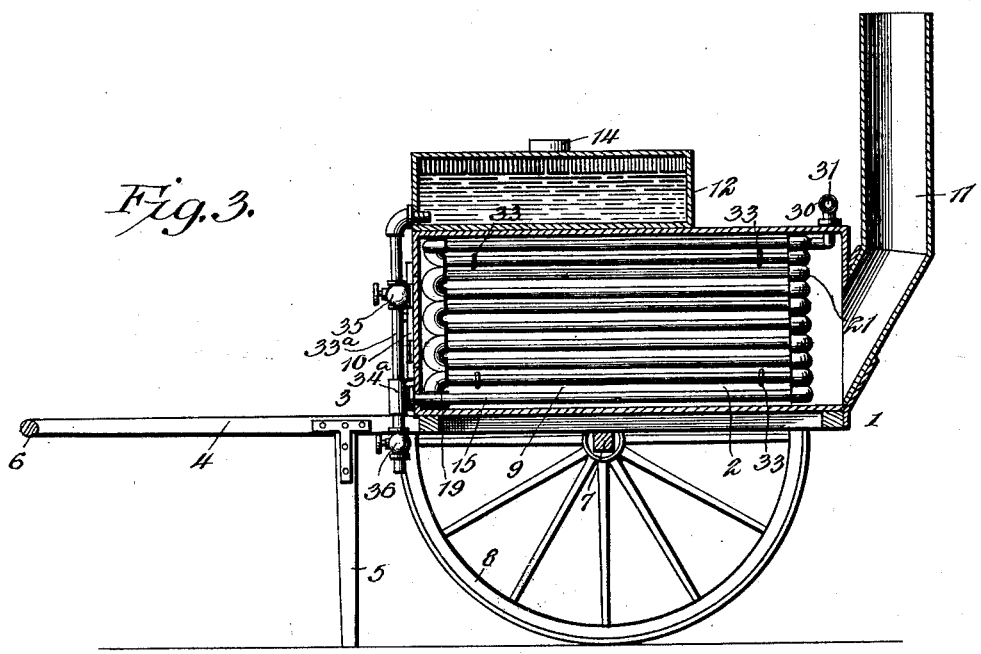
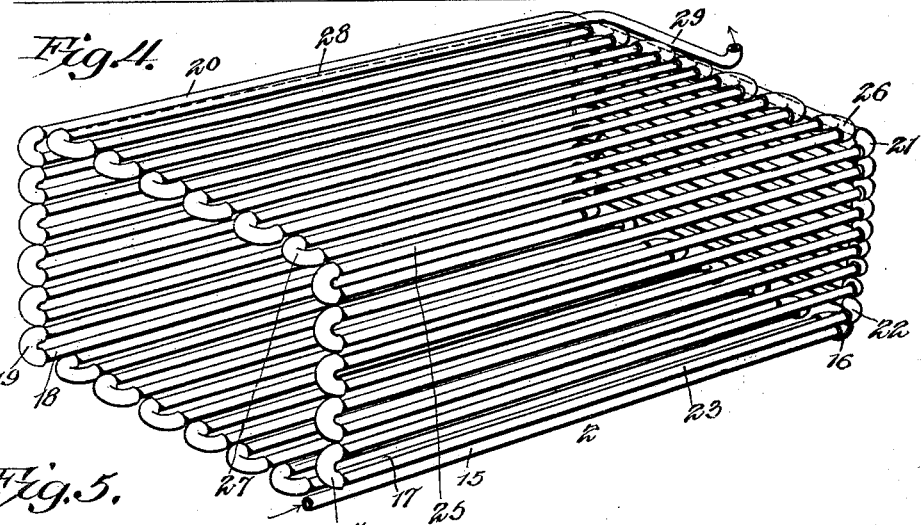
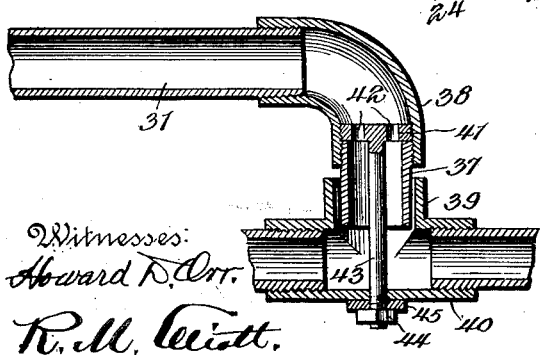

UNITED STATES PATENT OFFICE.

STEPHEN DECATUR SMITH, OF ORLANDO, FLORIDA.

MACHINE FOR PREVENTING DEPOSITION OF FROST ON VEGETATION.

SPECIFICATION forming part of Letters Patent No. 703,316, dated June 24, 1902.

Application filed August 15, 1901. Serial No. 72,126. (No model.)

*To all whom it may concern:*

Be it known that I, STEPHEN DECATUR SMITH, a citizen of the United States, residing at Orlando, in the county of Orange and State of Florida, have invented a new and useful Machine for Preventing Deposition of Frost upon Vegetation, of which the following is a specification.

This invention relates to machines for preventing deposition of frost upon vegetation generally.

The object of the invention is to present a thoroughly practical, efficient, convenient, and inexpensively operable device for counteracting the effects of frost, thereby to effect protection of orange-groves, pineries, vegetable-gardens, strawberry-beds, and any kind of vegetable growth from damage from severe frost or to raise the temperature of the atmosphere for any other purpose.

With these and other objects in view the invention consists in the novel construction and combination of parts of a machine of the character specified, as will be hereinafter fully described and claimed.

Generally stated and as is well known, formation of frost occurs when the sky is clear, the air dry and still, and the dew-point is below the freezing-point. It will therefore be recognized that by the provision of means for generating and dispersing a large volume of steam and that close to the ground the conditions favorable for the formation of frost are destroyed, so that in a simple, thoroughly-efficient, and ready manner fruit and vegetables may be effectually shielded from the destructive action of frost.

In the accompanying drawings, forming a part of this specification, and in which like numerals of reference indicate corresponding parts, I have illustrated a form of embodiment of the invention capable of carrying my ideas into effect, it being understood that the manner of construction and arrangement of parts herein shown may be changed or varied without departing from the spirit of the invention, and in these drawings—

Figure 1 is a view in perspective exhibiting a machine embodying my invention. Fig. 2 is a view in transverse section. Fig. 3 is a view in longitudinal vertical section. Fig. 4 is a detached view in perspective of the combined fire-box and heating-coils. Fig. 5 is a sectional detail view of the manner of associating the steam distributers or nozzles with the steam-supply pipe.

Referring to the drawings, 1 designates the vehicle and housing of the steam-generating mechanism, (designated generally by the numeral 2.) The vehicle comprises a frame 3, composed of side bars 4, front legs 5, a handle or cross-bar 6, the axle 7, secured to the side bars 4, and carrying supporting-wheels 8, which enable the device to be pushed over the ground. The housing constitutes a hot-air chamber 9 and has its front portion provided with a door 10 and its rear portion with a smoke-escape pipe 11. Upon the top of the housing is arranged a water-tank 12, the same being filled through an opening normally covered by a cap 14, as clearly shown in Figs. 1 and 3. The housing and tank are by preference constructed of sheet metal, although the parts may be made of sheets of cast-iron suitably assembled.

The salient feature of the invention is the combined fire-box and steam-generating coil. This, as shown in Fig. 4, is composed of a plurality of sections of piping disposed in such manner as to constitute a continuous casing, the top, bottom, sides, and one end being formed by the pipes and the front end, or that adjacent to the fire-door, being open. In constructing the fire-box in the manner shown the inlet-pipe 15 extends to a point near the rear end of the hot-air chamber and thence is coupled by a U-joint 16 with another section of pipe 17, this order being maintained to the opposite side of the structure, the U-joints of all these pipes lying in a horizontal plane. The last pipe 18 of the series on the side opposite the inlet-pipe is connected with a coupling 19, disposed in a vertical plane, and the sections of pipe forming the side, the rear end, and the inlet side are connected by L-joints at the rear corners of the fire-box, this order being maintained to the pipe 25, forming the top pipe of the side, the end of which is connected with a U-coupling 26, disposed in a horizontal plane, the other end of the pipe being connected with a U-coupling 27, also disposed in a horizontal plane, this order being kept up to the pipe 28, forming the last of the series of the top pipes, this pipe being extended back to the end of the structure, then bent at right angles, as shown at 29, and having its end upturned and connected with a T-joint 30, as shown in Fig. 1, the T-joint 30 having connected with it two distributing-pipes 31, carrying distributing-nozzles 32, the nozzles of which terminate in jet-orifices and are disposed either at a downward or upward inclined angle to the supply-pipes, the first arrangement of the nozzles being employed when vegetation near the ground is to be treated, and the second when tall vegetation, such as orange-trees, is to be treated, as in the latter instance the steam should be projected toward the tops of the trees.

As a means for holding the fire-box and heating-coil within the fire-box, hooks or cleats 33 are employed, the hook ends of which engage with pipes of the side series and projecting outward through the side of the casing and carrying nuts 34, which effect the rigid clamping of the coil within the chamber. Connecting with the water-tank 12 at its front, and preferably in a corner, is a pipe $33^a$, carrying a T-coupling $34^a$, with which the pipe 15 of the coil connects, the pipe $33^a$ being projected below the heating-chamber and carrying a valve 35, by which water may be admitted to the coils, a valve 36 on the lower end of the pipe $33^a$ serving, when open, to permit the draining of the tank and coils.

The manner of connecting the nozzle 32 with the pipe 31 may be of any preferred style that will insure ready rotation of the nozzles, the form herein shown being one that may be employed and will be found effective in operation. It consists of a short section of pipe 37, having a threaded connection with the elbow 38 at the end of the pipe 31, the lower end of the pipe 37 being projected into a member 39 of a T-coupling 40, with which the two nozzles engage. To hold the T-coupling 40 associated with the coupling 38, a bolt 41 is employed, the head of which is provided with a plurality of orifices 42, through which steam escapes to the nozzles, the head 41 of the bolt by preference having a threaded connection with the elbow 38 and bearing upon the upper end of the pipe 37; but it is to be understood that I do not limit myself to having the bolt-head threaded to the coupling 38, as the same may be loosely mounted within the coupling. The shank 43 of the bolt passes through the lower wall of the T-coupling 40 and carries a nut 44, bearing upon a washer 45, the nut serving to hold the T-coupling assembled with the pipe 37 in such manner as to permit the nozzles readily to rotate, rotation being effected by the resistance opposed by the air to the escape of steam from the nozzles, as will be readily understood. The distance that the nozzles will be raised above the ground will be determined by the length of the section of pipe 37, it being obvious that by connecting one end of a pipe of any desired length with the elbow 38 and having a straight coupling on its opposite end the pipe 37, with the bolt 41, will thread into this coupling in the same manner as shown at 38, and the nozzles will thus be caused to travel as near to the ground as may be desired.

In operating the device the tank 12 is filled by removing the cap 14, the valve 36 is closed, and the valve 35 opened to permit the coil to be filled with water. Suitable fuel, as wood or coal, is then supplied to the fire-box formed by the four sides and end presented by the arrangement of the coils of pipe described. By reason of the fact that the fire is directly on the coils and that the combustion takes place in direct contact with the entire surface thereof it will be obvious that the steam will be rapidly generated and in large volume. As soon as the steam begins to escape from the nozzles 32 the machine is propelled over the ground to the points desired and a cloud of steam is deposited upon the vegetation, as will be readily understood. By reason of the angular disposition of the jet-nozzles with relation to the pipes 32 the steam will be projected over a large area immediately under and around the structure, so that with but a slight expenditure of labor a large surface of ground may be thoroughly subjected to the action of heat.

In addition to operating as a steam-distributer for the purpose described the structure may be used for heating purposes, as for heating hot-houses or the like, and when this is to be effected, if dry heat be desired, the valves 35 and 36 are opened to empty the tank and coils of water, and the fire is then built in the fire-box in the usual manner.

It will be seen from the foregoing description that by the employment of this peculiar form of fire-box, the same constituting at once a heating-coil and a grate, practically all of the heat from the fuel is utilized, because the fuel rests directly on the bottom coils and the flame impinges against the side, top, and end coils. By reason of the fact that the steam at all times has free egress the device will be perfectly safe in use, as there will be no danger of explosion, the steam, as stated, escaping as rapidly as generated.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

What I claim is—

1. In an apparatus of the character described, the combination with a vehicle comprising a casing, of a steam-generating coil therein constituting a fire-box, a smoke-flue leading from the casing, a water-supply tank mounted on the casing and communicating with the coil at one end, and steam-distributing means communicating with the opposite end of the coil and located exterior to the casing.

2. In a device of the character described, the combination with a vehicle comprising a casing, of a steam-generating coil located within the casing and constituting a fire-box, a water-supply tank in communication with one end of the coil and supported directly upon the casing, whereby the water will be heated before being supplied to the coil, a smoke-flue leading from the casing, and a plurality of delivering devices communicating with one end of the coil and located exterior to the casing.

3. In a device of the character described, the combination with a vehicle comprising a casing having a fire-door at one end and a smoke-flue at its opposite end, of a steam-generating coil located within the casing and constituting a fire-box having its top and bottom and side walls and its rear end wall composed of tubing, a water-supply tank mounted on the casing and communicating with the coil at its lower end, and distributing devices located exterior to the casing and communicating with the upper end of the coil.

4. In a device of the character described, the combination with a vehicle comprising a casing having a fire-door at its front end and a smoke-flue leading from its rear end, of a water-supply tank supported directly upon the casing, a steam-generating coil located within the casing and constituting a fire-box open at its front end and having its top and bottom and side walls and its rear end wall composed of tubing, a valve-controlled pipe establishing communication between the water-tank and one end of the generating-coil located at the bottom of the fire-box, a branched pipe disposed upon the exterior of the casing and communicating with the upper end of the coil, and distributing devices carried by said branched pipe and located beyond the opposite sides of the vehicle.

5. In an apparatus of the character described, the combination with a vehicle comprising a casing, of a steam-generating coil therein constituting a fire-box, a smoke-flue leading from the casing, a water-supply tank communicating with the coil at one end, a plurality of pipes communicating with the opposite end of the coil and extended beyond the opposite sides of the vehicle, and independent rotary distributers disposed at the outer extremity of each of said pipes.

6. In an apparatus of the character specified, the combination with a steam-generator, of rotary steam-distributing means connected therewith, said means comprising a coupling carrying nozzles, and a bolt for connecting the coupling with the nozzle-supporting means, the head of the bolt being provided with steam-escape openings.

In testimony that I claim the foregoing as my own I have hereto affixed my signature in the presence of two witnesses.

STEPHEN DECATUR SMITH.

Witnesses:
J. C. ARMS,
SUMTER F. DAVIS.